(12) United States Patent
Gelman et al.

(10) Patent No.: US 6,493,348 B1
(45) Date of Patent: Dec. 10, 2002

(54) XDSL-BASED INTERNET ACCESS ROUTER

(75) Inventors: Alexander Gelman, Smallwood, NY (US); Rajesh B. Khandelwal, Parsippany, NJ (US)

(73) Assignee: Telcordia Technologies, Inc., Morristown, NJ (US)

( * ) Notice: Subject to any disclaimer, the term of this patent is extended or adjusted under 35 U.S.C. 154(b) by 0 days.

(21) Appl. No.: 09/204,049

(22) Filed: Dec. 2, 1998

Related U.S. Application Data

(60) Provisional application No. 60/067,622, filed on Dec. 5, 1997.

(51) Int. Cl.$^7$ .............................................. H04L 12/56
(52) U.S. Cl. ..................... 370/401; 370/356; 370/395.1; 370/398; 370/535
(58) Field of Search ............................... 375/351, 352, 375/356, 386, 389, 390, 392, 395, 398, 401, 535, 537, 538, 539, 596, 542, 543

(56) References Cited

U.S. PATENT DOCUMENTS

| | | | | |
|---|---|---|---|---|
| 5,305,312 A | * | 4/1994 | Forned et al. ............... 370/264 |
| 5,410,343 A | * | 4/1995 | Coddington et al. ..... 379/93.12 |
| 5,583,863 A | | 12/1996 | Darr, Jr. et al. ............. 370/397 |
| 5,594,491 A | * | 1/1997 | Hodge et al. ................ 725/101 |
| 5,608,447 A | * | 3/1997 | Farry et al. .................. 725/116 |
| 5,619,650 A | | 4/1997 | Bach et al. ............. 395/200.01 |
| 5,666,487 A | | 9/1997 | Goodman et al. ..... 395/200.76 |
| 5,673,265 A | | 9/1997 | Gupta et al. ................. 370/432 |
| 5,812,786 A | * | 9/1998 | Seazholtz et al. ...... 395/200.63 |
| 6,081,533 A | * | 6/2000 | Laubach et al. ............. 370/421 |
| 6,085,245 A | * | 7/2000 | Kaycee et al. ............... 709/224 |
| 6,130,879 A | * | 10/2000 | Liu .............................. 370/230 |
| 6,137,839 A | * | 10/2000 | Mannering et al. ......... 375/260 |
| 6,212,227 B1 | * | 4/2001 | Ko et al. ...................... 375/222 |
| 6,246,695 B1 | * | 6/2001 | Seazholtz et al. ........... 370/468 |

* cited by examiner

Primary Examiner—Hassan Kizou
Assistant Examiner—Saba Tsegaye
(74) Attorney, Agent, or Firm—James W. Falk; Joseph Giordano

(57) ABSTRACT

An Internet protocol based system and method facilitate communication and improve the overall network performance between remote user terminals and Web servers across the parts of the Internet (or IP-based Intranets), that are configured by a communications network, including an asynchronous transfer mode (ATM) network. In particular, the system includes a plurality of Local Area Networks (LANs), such as Ethernet LANs, each comprising a plurality of user terminals or PCs. The system further comprises at least one network switch (such as an ATM switch), and at least one digital subscriber line (xDSL) access router, each connected between a corresponding LAN and the network switch. The xDSL access routers function both as a router and a digital subscriber line multiplexor. Thus, each user terminal communicates directly with its default router, and vice-versa, obviating the requirement of communicating via the network switch (e.g., ATM switch) to the default IP edge routers. Further, in the case where Quality of Service is required, the xDSL access router serves as the default router for the Web server, and the physical path between the Web server and the terminal can be minimized to one pass through the network switch and thereby reducing traffic through the communications network.

7 Claims, 5 Drawing Sheets

XDSL-BASED INTERNET ACCESS ROUTER

RELATED APPLICATION

This application is based on Provisional Application Ser. No. 60/067,622 filed on Dec. 5, 1997, entitled "XDSL-Based Internet Access Router."

GOVERNMENT INTEREST

This invention was made with United States Government support under Cooperative Agreement No. 70NANB5H1177 awarded by the National Institute of Standards and Technology. The United States Government has certain rights in the invention.

FIELD OF THE INVENTION

The present invention relates generally to an Internet protocol (IP) based system, and more particularly, to an IP based system that facilitates communication and quality of service (QoS) between remote user terminals and Web servers across parts of the Internet that are configured by an asynchronous transfer mode (ATM) network or other communication networks.

BACKGROUND OF THE INVENTION

An asynchronous transfer mode network is a network that can transfer information from one or more sources to one or more destinations. The ATM network can be deployed for configuring parts of the Internet, thus comprising a communication network. The communication network itself may be composed of multiple communicating nodes (e.g., terminals, routers, servers, switches, etc.) that are interconnected to each other by physical communication links (wires, cables, optical fibers, RF channels, etc.). An ATM-equipped node transmits a signal containing a bit stream to an adjacent node via the communication link that connects the two adjacent nodes. The transmitted bit stream is organized into fixed sized packet or "cell"slots for carrying, e.g., 53 byte packets called cells. Illustratively, each cell has a 5 byte header for communicating control information, and a 48 byte payload for communicating a message to be conveyed between nodes. A node allocates a "virtual channel" to each communication, which, amongst other things, identifies an adjacent node to which cells of the communication must be transmitted. A sequence of virtual channels of nodes on a path between a source node and a destination node identifies a virtual channel connection.

The source node transmits cells to the destination node via this sequence of virtual channels, i.e., from node to node on the path, in a bucket brigade like fashion. Prior to transmitting the information, the source node segments the information into 48 byte sized messages and appends a 5 byte header to each such message to form a cell. The source node writes a virtual address, such as a virtual channel identifier, which enables each node on the path that receives the cell to determine the outgoing virtual channel on which to transmit the cell. A destination node receiving the cells extracts the messages from the payloads and reassembles the messages (in the appropriate order) into the originally transmitted information.

It is important to note that, when communicating between Local Area Networks (LANs) (such as Ethernets) on the Internet which is configured by various links and networks including the ATM network, the data-link layer communications in LAN networks are different than those in the ATM networks. Thus, bridges are utilized to receive information from one network (e.g., LAN) transmitted according to the respective data-link layer and retransmit the information in the other network (e.g., ATM network) according to its respective data-link layer. In other words, bridges decouple the two incompatible data-link layers from each other, yet enable communication between nodes in each of the two networks.

At the network layer, all of the nodes may communicate using the same protocol, e.g., the Internet protocol (IP). Like the Ethernet protocol, each node that can serve as a source or destination node is assigned an IP identifier, or IP address. Information is transmitted from a source node to a destination node in a bit stream that is organized into packets. As previously stated, each packet has a header and a payload. The IP address of the source node is written in a source field of the packet header, and the IP address of the destination node is written in a destination field of the packet header. The data is then written in the payload. The packet is then transmitted according to the appropriate data-link layer protocol for the network (e.g., formed into Media Access Control (MAC) frames, divided into ATM cells, etc.) and then transmitted to its respective destination node. IP provides a routing function for routing a packet from node to node in a sequence of nodes until the packet arrives at its destinations using routing tables.

Such communications networks are becoming increasingly important vehicles for delivering video, audio and other data to and from remote user terminals. For example, such networks are used to support video-on-demand, near video-on-demand, and pay-per-view applications. However, problems are evident in terms of adequate bandwidth.

Typically, wideband (1–10 Mb/s) access technologies are relatively expensive and specialized (such as T1 lines), such that their use has been primarily by large institutional customers, such as large corporations, universities, and government agencies. However, a number of new network access technologies are now moving from the research labs into general availability. For example, some network providers have started to deploy hybrid fiber coax access lines, as well as cable modems. Further, trials and limited deployments of a variety of Digital Subscriber Line (xDSL) (e.g., Asymmetrical Digital Subscriber Lines—ADSL) technologies are also ongoing. All of this activity is intended to bring broadband networks to the mass market. The ATM network, as previously described, is intended to "bridge the gap" in providing wideband transmission rates to a remote user in an Internet environment.

A conventional IP based system is shown in FIG. 1. System 10 includes groups 12a, 12b through 12N of remote user terminals 15, where each group is part of an Ethernet or other LAN system. Each group 12a, 12b through 12N is connected to a respective Ethernet bridge, illustratively an Asymmetrical Digital Subscriber Line (ADSL) termination unit—remote side (as opposed to a central office side) ATU-R 18a, 18b through 18N, respectively, for providing an Ethernet bridge between the LAN system and the respective default IP router. ATU-Rs 18a, 18b, 18c through 18N are also connected to respective telephones 16a, 16b, 16c through 16N.

System 10 further includes a plurality of ADSL based Digital Subscriber Line Access Multiplexors (DSLAM) 20a through 20N, each of which is connected to a plurality of ATURs. Each DSLAM provides basic transport and multiplexing functions between each respective ATU-R 18 and an ATM switch 22. ATM switch 22 is further connected to a plurality of Web servers 28a through 28N, IP edge routers 26a through 26N and IP backbone router 24 for connection to the Internet. The function of each will be described below.

First, we describe the ADSL technology. ADSL was motivated by the goal of achieving wideband transmission rates over existing copper loops. The concept has achieved a growing acceptance by the telecommunications industry and resulted in a standardization effort.

The main idea behind ADSL is that overlapping parts of the spectrum should be present only for signals that are propagating in the same direction within a single bundle of copper wire pairs. This approach reduces the effect of near-end and far-end crosstalk, and hence makes wideband transmission rates feasible for reasonably large loop lengths (up to 18,000 ft). Several characteristics of traditional ADSL systems are specifically tailored to their intended application in residential local loops. These include the asymmetry of bandwidth and the support for life-line telephony as an inseparable component. Note that ADSL technology is suitable for Internet access service. For example, a 10 baseT (10 bT) interface is located at the ATU-R for personal computer protocols.

A DSLAM is utilized in the IP based system to support ATM bearer service for IP applications. In an ATM bearer service scenario, the interface on the user side is configured as an ATM user to network interface over an ADSL. On the ATM network (trunk) side, the interface is configured as a network to network interface over a synchronous optical network (SONET) transport. Typically, DSLAMs are located in the central office; however they can also be remote such that they are connected over significant distances by single mode fiber links.

DSLAMs support life-line telephony and an asymmetric high/low speed data channel. The DSLAM upstream data channels typically support data rates of 9.6–156 kb/s. The downstream bit rate is either fixed or distance-dependent. For some early commercial products, a 2.3 Mb/s rate was specified for distances of no more than 3 km, and about 4 Mb/s can be supported over loops shorter than 4 k m.

The number of subscriber lines per OC-3c trunk is a function of the Quality of Service (QoS), which is required from the ATM bearer service to support the target set of applications. Each OC-3c interface on the ATM network side of the DSLAM provides a line rate of 155.52 Mb/s, giving an effective ATM cell rate close to 150 Mb/s, which leaves an effective bit rate of about 135 Mb/s. If, for example, a non-blocking streaming service is supported for video applications of a constant bit rate of 2.5 Mb/s, then a DSLAM can be configured to support 48 ADSL lines (2.5 Mb/s×48=120 Mb/s). Note that DSLAMs have been designed to provide access to a broadband backbone, characterized by the ATM transport service on the top of the SONET broadband digital hierarchy.

As described above, ADSL-based DSLAMs provide subscriber line multiplexing functionality for Internet Protocol based system. As shown in FIG. 1, DSLAMs 20 crossconnect the user terminals 15 or Ethernet 12 to the IP edge routers 26, via ATM switch 22.

A conventional router suffers performance degradation due to processing overloads since it typically support a large population of users. Accordingly, it is common for the router administrators to turn off some important functions (e.g., packet filtering, RSVP, etc.) to improve the router performance.

FIG. 2 illustrates the protocol stack for the system of FIG. 1. As shown, protocol stack 30 from the user terminals (or PCs) 15 includes a network layer, a data link layer and the physical or PHY layer. The network layer comprises the IP which includes the destination and source addresses, the data link layer comprises the link layer control (LLC) and media access control (MAC) which includes information pertaining to when to transmit and how to construct the frame, and the PHY comprises the 10bT which represents a 10 MHz NRZI signal.

Protocol stack 32 from the ATU-Rs 18 consists of ADSL layer (physical and data link), ATM, and ATM adoption layer (AAL) on the DSLAM side and 10bT and MAC layer on the user side. Protocol Stack 38 at the IP Router includes the SONET, ATM, AAL, and LLC on the ADSL (user) side and SONET, ATM, and AAL on the network side. Protocol stack 34 from the DSLAM comprises ATM and ADSL on the user side and ATM and SONET on the network side. The ATM switch 22 maintains the layer protocols. Protocol stack 38 provides simulation of the Ethernet bridge on the user side by injecting the LLC-layer.

An example of the operation of the conventional Internet based system 10 is as follows. Consider that Web server 28a wishes to communicate with user terminal 15 that resides on LAN 12b. Now, depending on which IP edge routers are assigned to Web server 28a and to this terminal, there will be at least two passes of the data packets through the ATM switch 22. Consider a best case scenario in which Web server 28a and terminal 15 on LAN 12b are both assigned to IP edge router 26N. Thus, the minimum path between Web server 28a and terminal 15 on LAN 12b must include a link from Web server 28a to IP edge router 26N through ATM switch 22. Then a link must be established from IP edge router 26N, through ATM switch 22, to LAN 12b, via DSLAM 20a. This path passes twice through ATM switch 22, thus contributing to traffic. Of course, if the Web server and terminal were assigned to different IP edge routers, then a minimum of three passes through ATM switch 22 are necessary, since an additional link would also have to be established from the IP edge router assigned to the terminal and the IP edge router assigned to the Web server via the ATM switch 22.

Note that under the architecture of FIG. 1, the DSLAMs functionality are limited to providing transport and multiplexing functions. The IP edge routers, in addition to the IP routing mechanism, provide the Ethernet bridging capability in order to be able to address the user's LANs. Accordingly, the system of FIG. 1 suffers from a number of performance deficiencies.

Specifically, the IP edge routers become bottlenecks due to the large amount of processing that they have to perform on in-bound and on out-bound packets. It becomes tw difficult to support QoS in the routers since the bandwidth and processing resources are in a deficit. Consider if a user requires a stream of video information to be transmitted from a Web server, then this stream needs to follow a path from the Web server to an appropriate edge router, take one or more hops between the Web server's edge router and the edge router to which the user is assigned, and then follow a path from the edge router assigned to the user to the user terminal. Only then will the stream of video information reach the user's LAN.

Another disadvantage is that the Address Resolution Protocol (ARP) mechanism requires the router to broadcast the address to be resolved on the LANs. Thus, since the router simulates the LAN bridge, the ARP must be transmitted over the ATM network. Accordingly, additional traffic is added on the ATM network.

It is therefore an object of the present invention to overcome the deficiencies evident in the prior art.

SUMMARY OF THE INVENTION

An aspect of our present invention is an Internet protocol based system and method for facilitating communication and improving communications between remote user terminals and Web servers across parts of the Internet configured by a communications network, such as an ATM network.

The system includes a plurality of LAN networks, such as Ethernet LANs, each comprising a plurality of user terminals or PCs. The system further includes a network switch, illustratively an ATM switch, and at least one digital subscriber line (xDSL) access router, each connected between a corresponding LAN and the network switch. The xDSL be (e.g. ADSL) access routers function both as a router and a digital subscriber line multiplexor. Thus, each user terminal can communicate directly with its default router, and vice-versa, obviating the requirement of communicating with its default router via the ATM switch and reducing traffic in the ATM network.

In addition, the IP based system further comprises at least one bridge, such as an ADSL termination unit (ATU-R), each coupled between a respective LAN and a respective xDSL access router. Further, the IP based system further comprises an IP backbone router for connecting the ATM-configured network to the rest of the Internet.

Because each xDSL access router of our inventive IP based system supports a relatively small number of customers (from a few tens to a few hundreds), vis-a-vis an IP edge router, the xDSL access router can process traffic more efficiently and with far less risk of overload. In contrast, conventional routers suffer performance degradation due to processing overloads since they support much greater populations of users. Accordingly, it is common for the router administrators to turn off some important functions (e.g., packet filtering, RSVP, etc.) to improve the router performance.

In special situations, when uncompromised QoS is required (e.g., for Video On Demand Applications) the xDSL access router could serve as the default router for specialized Web servers, thus allowing direct connections from user terminals to the Web servers for better support of the IP QoS by utilizing any kind of the QoS mechanism (e.g. based on RSVP protocol) which typical servers do not utilize due to traffic constraints.

BRIEF DESCRIPTION OF THE DRAWINGS

The following detailed description, given by way of example and not intended to limit the present invention solely thereto, will best be understood in conjunction with the accompanying drawings, where similar elements will be represented by the same reference symbol, in which.

DETAILED DESCRIPTION OF THE PREFERRED EMBODIMENTS

Figure 1:
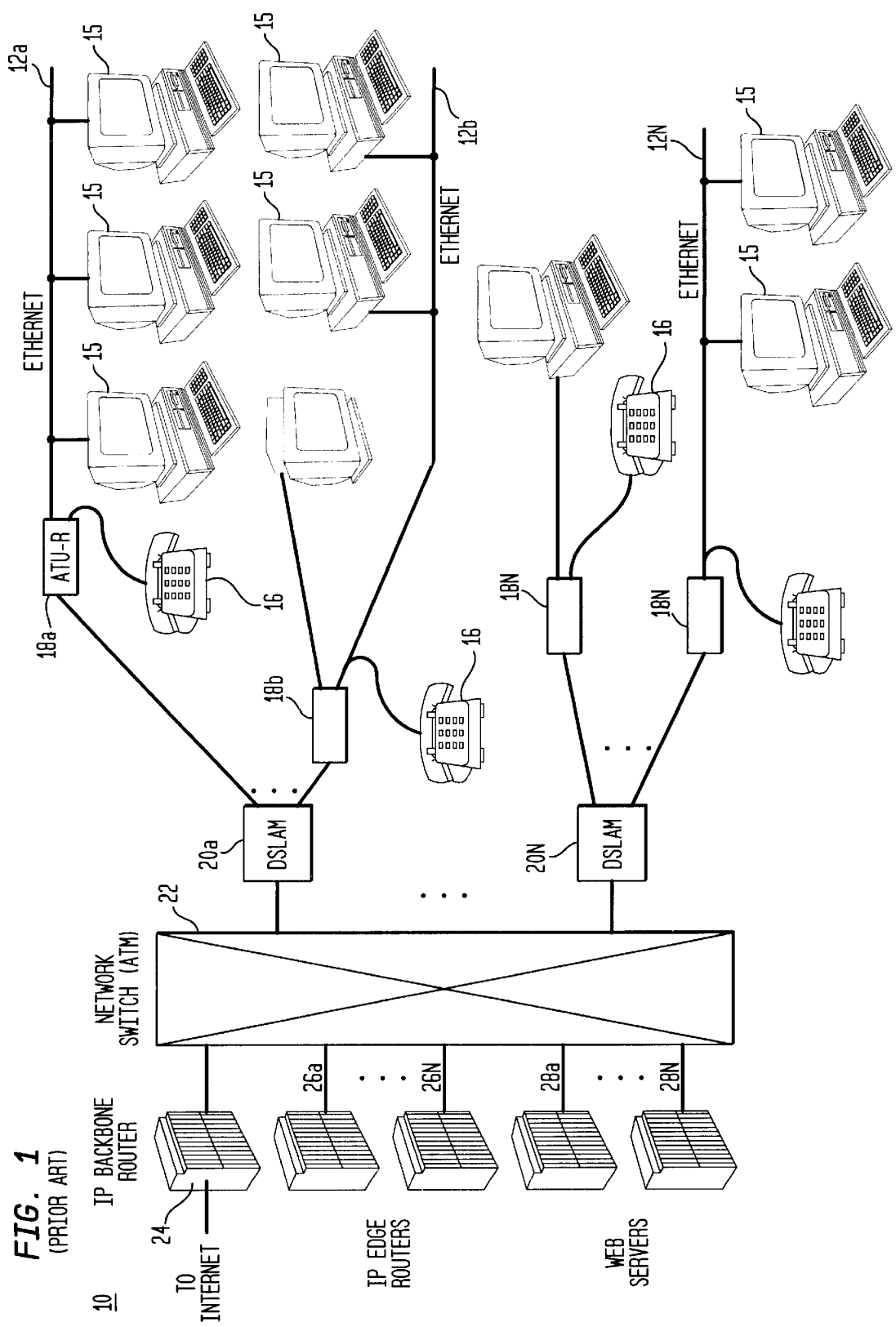
FIG. 1 schematically illustrates a conventional IP based system.
Figure 3:
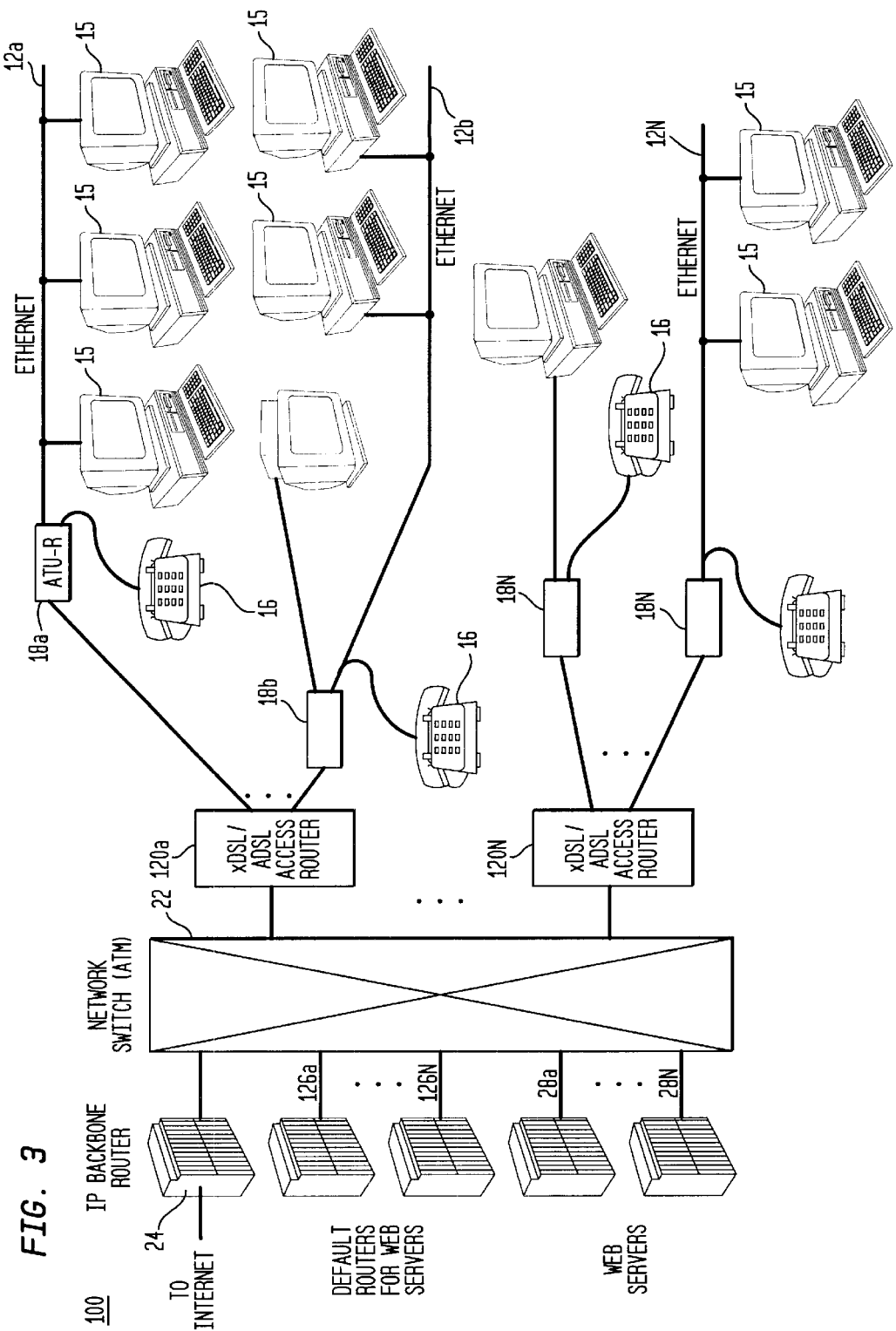
FIG. 3 schematically illustrates the inventive IP based system having xDSL-based access routers in accordance with an aspect of the present invention.

Our inventive IP based system 100 is shown in FIG. 3. System 100 illustratively shows an ATM network; however, it should be understood that any communications network may be utilized as desired. By way of illustration and not limitation, such communication networks may include digital cross-connect network based on Ti (El) or DS3 (E3), frame relay and ATM, or any combination thereof. The present invention applies to the Internet as well as IP based Intranet. Similar to system 10 of FIG. 1, system 100 includes groups 12a, 12b through 12N of remote user terminals 15, where each group is part of an Ethernet or other LAN system. Each group 12a, 12b through 12N is connected to a respective Ethernet bridge, illustratively an ADSL termination unit—remote side (as opposed to a central office side), ATU-R 18a, 18b, 18N, for providing an Ethernet bridge between the LAN system and respective default router.

ATU-Rs 18a, 18b, 18c through 18N are also connected to respective telephones 16a, 16b, 16c through 16N. However, instead of utilizing a plurality of ADSL based DSLAMs as in system 10, system 100 utilizes xDSL (e.g., ADSL) access routers 120a through 120N that are connected between the ATM switch 22 and respective ATU-Rs. Further, in accordance with an aspect of our invention, IP edge routers are no longer utilized as default routers for the user terminals, and user terminals can communicate directly with its default router without going through the ATM switch. Edge routers may continue to serve as default routers for Web servers.

Figure 4:
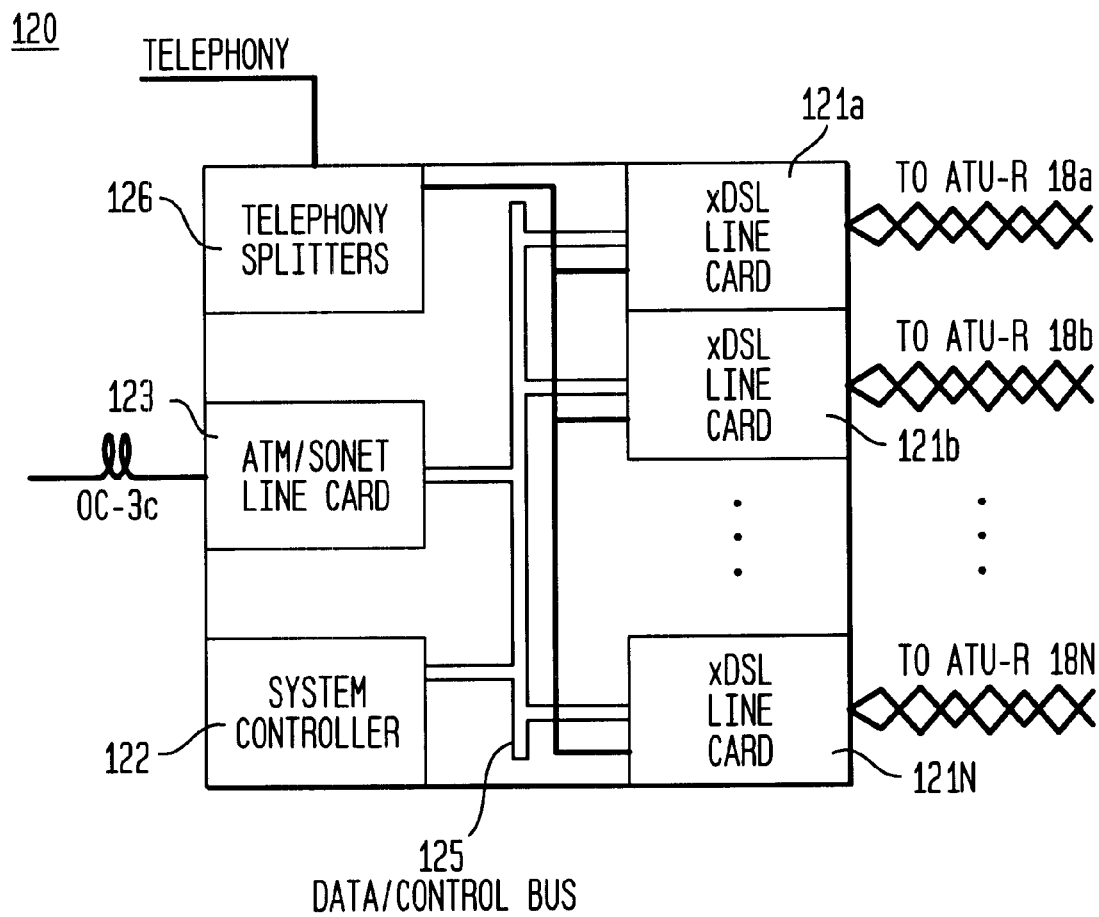
FIG. 4 illustratively depicts an embodiment of our inventive access router in accordance with an aspect of the present invention.

FIG. 4 depicts an illustrative embodiment of our inventive xDSL access router 120, which comprises a bank of xDSL line cards 121a through 121N, a system controller 122, at least one ATM/SONET line card 123, a data/control bus 125, and a telephony splitter 126. The ATU-Rs 18 are connected to the xDSL access router 120 via the bank of xDSL line cards 121, which multiplex and demultiplex the packets received from and addressed to, respectively, the ATU-Rs 18. The ATM/SONET line card 123 serves as an interface between the ATM switch 22 and the xDSL access router 120. The xDSL line cards and the ATM/SONET line cards communicate via data/control bus 125. The system controller 122 manages the operation of the access router 120 and provides control signaling to its components. The routing and Ethernet bridging functions may reside in the system processor 122, but may also be partially implemented in a distributed fashion in the line cards. As shown in FIG. 4, telephony service is being passively coupled to and split from the data service in the telephony splitter 126 of the xDSL access router 120.

Figure 2:
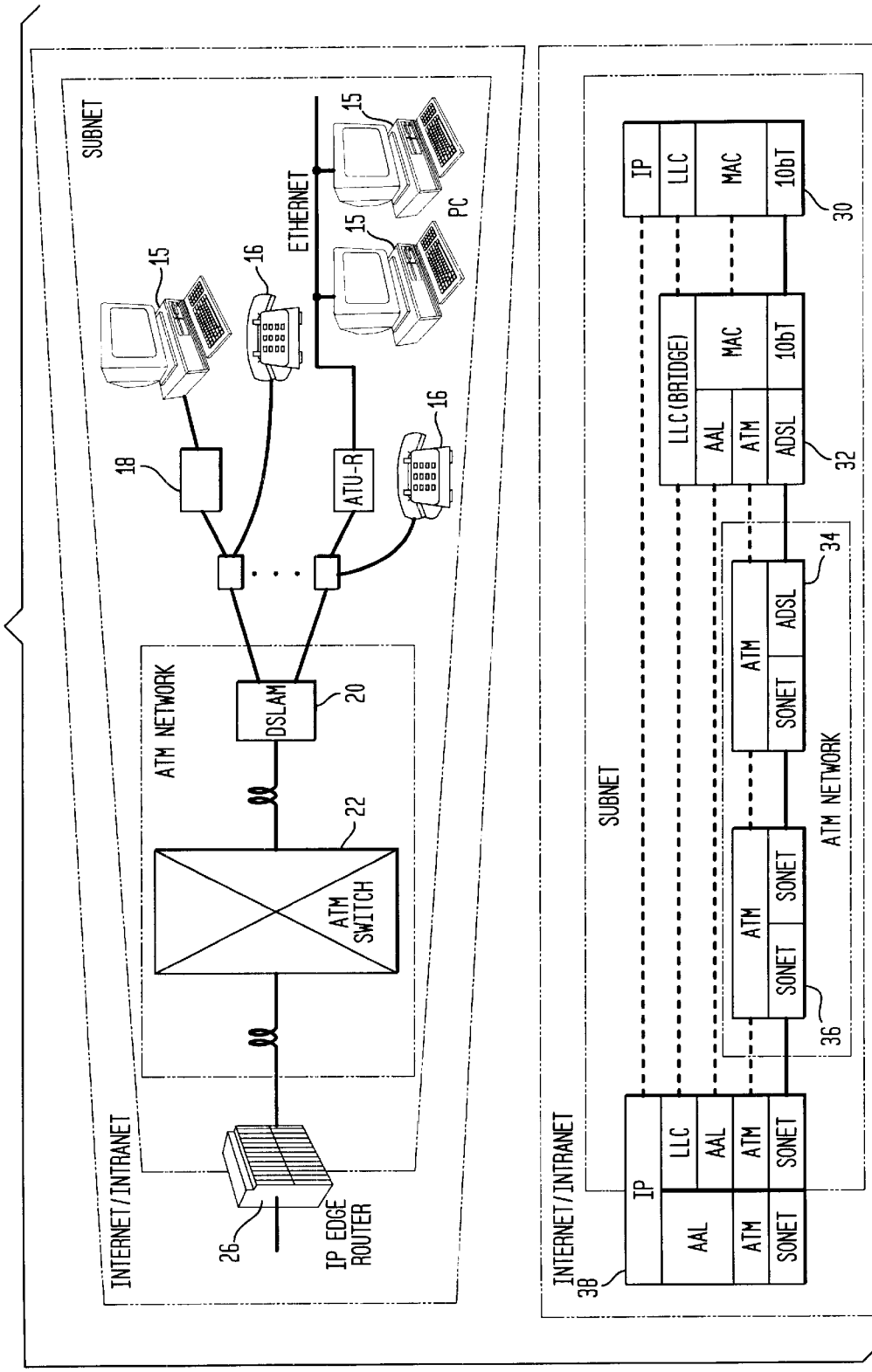
FIG. 2 illustrates the protocol stack for the system of FIG. 1.
Figure 5:
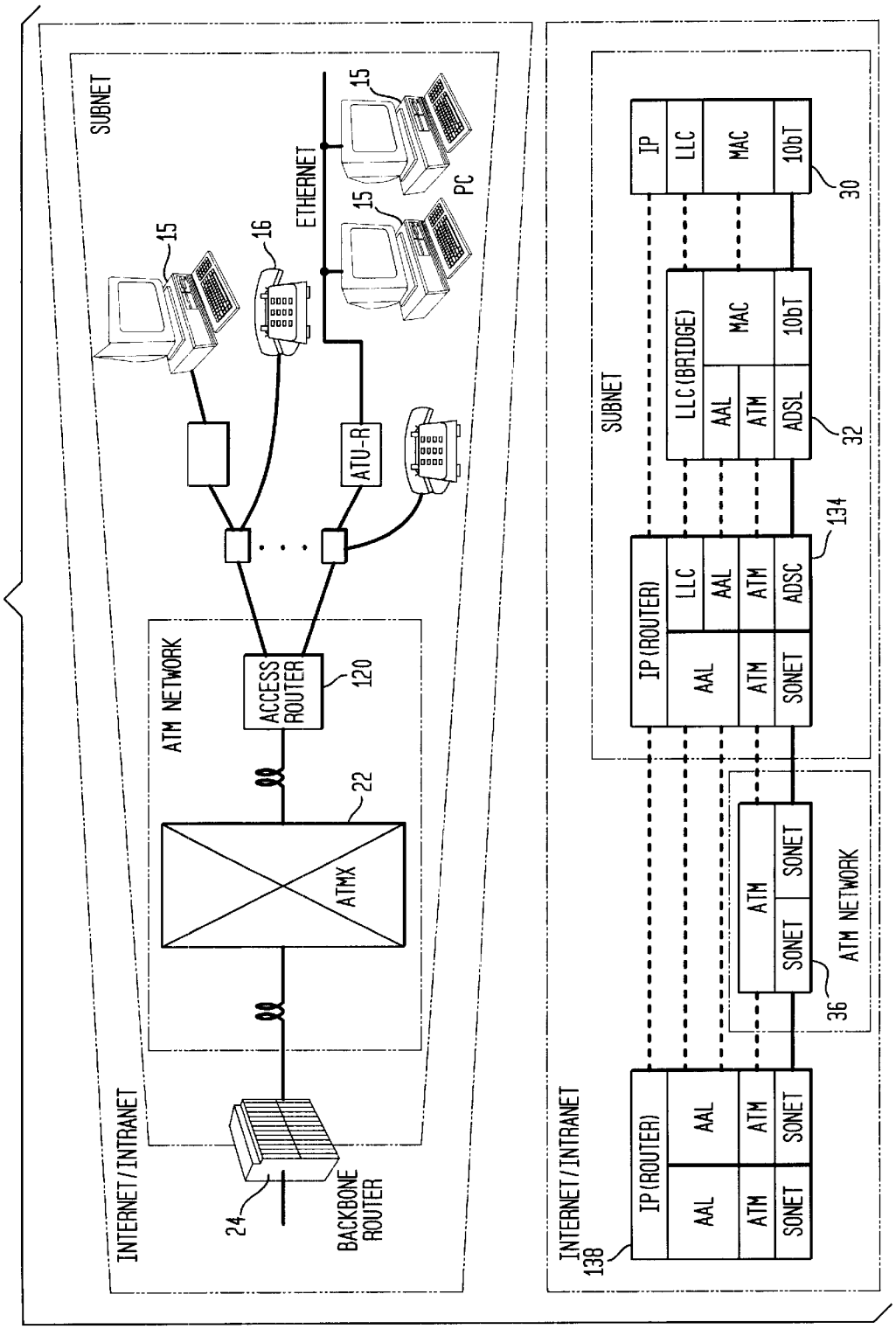
FIG. 5 illustrates the protocol stack for the system of FIG. 3 in accordance with the present invention.

FIG. 5 illustrates the protocol stack for the system of FIG. 3. Similar to FIG. 2, protocol stack 30 from the user terminals (or PCs) 12 includes a network layer (IP), a Data Link layer, and the physical or PHY layer. The network layer comprises the IP which includes the destination and source addresses, the data link layer comprises the link layer control (LLC) and MAC which includes information pertaining to when to transmit and how to construct the frame, and the PHY comprises the 10bT which represents a 10MHz NRZI signal. Further, protocol stack 32 from the ATU-Rs 18 comprises an Ethernet bridge, Mac layer, and the physical layer on the user side and an adaption layer (AAL), ATM layer and AAL on the network side.

Protocol stack 134 from the ADSL access router 120 supports AAL, ATM, and SONET (SDH) on the network side and LLC, AAL, ATM, and ADSL on the user side (i.e., the ADSL access router serves as a simulated bridge on the user side). Such router functions were previously performed by the IP edge routers 26 of FIG. 1.

As shown in protocol stack 36, the ATM switch 22 maintains the layer protocols. Lastly, protocol stack 138 from the backbone router 24 maintains the protocol layer it receives for scenarios of all-ATM network configurations. In case of heterogeneous networks, including, illustratively, combinations of ATM/SONET and ATM/DS3, protocol conversion would be appropriate.

An example of the operation of the Internet based system 100 is as follows. Consider Ado the case in which uncompromised QoS is required (such as for a Video On Demand application). For this case, the xDSL access router would serve as the default router for the Web server delivering this application as well. Therefore, if Web server 28a wishes to communicate with user terminal 15 residing on LAN 12b, a direct link from Web server 28a can be made to LAN 12b. Accordingly, only one pass through ATM switch 22 occurs. Further, xDSL access router 120a routes data from the Web server 28a directly to LAN 12b (and vice-versa). In another illustrative embodiment where QoS requirement is not as strict, the data from the Web server 28a could flow via the Web server's default router directly to the xDSL access router 120b and then to the user terminal 15 on LAN network 12b.

Our inventive IP based system eliminates the utilization of IP edge routers as default router for user terminals by combining the routing functions thereof with the xDSL access multiplexors. Thus, the Ethernet bridging functions are simulated in the xDSL access routers. Accordingly, since the Ethernet bridging functions occur outside the ATM network, the Address Resolution Protocol (ARP) mechanism does not contribute to the traffic on the ATM network.

The advantages of the xDSL access router of the inventive IP based system includes the benefit, unlike the conventional IP edge routers, of supporting a relatively small number of customers (from a few tens to a few hundreds). Thus, the xDSL access router can process traffic more efficiently and without overload. In contrast, a conventional router suffers performance degradation due to processing overloads as they must support a far greater number of users. Another advantage is that, in cases in which uncompromised QoS is required, the xDSL access router allows direct connections between a user terminal and a Web server, without multiple passes through the ATM switch. This provides greater efficiency as well as better support of the IP QoS by means utilizing any kind of QoS mechanism (e.g., based the RSVP protocol, or a completely proprietary protocol). In addition, by combining the multiplexing and routing functions as described herein, the overall system cost is significantly reduced.

Finally, note that the above discussion is just a preferred embodiment of the invention and is only provided as an illustrative description of the invention. Numerous alternative embodiments may be devised by those skilled in the art without departing from the spirit and scope of the following claims.

What is claimed is:

1. An Internet protocol based system for facilitating communication of bit streams organized into packets, each including a message portion and an address header portion, and for improving network and service performance between remote user terminals and web servers across a communications network, said system comprising a plurality of groups of terminals, a packet switch, a backbone router connected to one side of said packet switch and providing access to the Internet network from said packet switch, a plurality of web servers and default routers for said web servers also connected to said one side of said packet switch, and means for establishing connections between said user terminals and said web servers without multiple passes through said packet switch and without the need for IP edge routers to act as default routers for user terminals, said means including a digital subscriber line access router connected between each of said groups of terminals and the other side of said packet switch, each said digital subscriber line access router including a subscriber line multiplexor and means responsive to said header portion of a packet for routing said packet through said packet switch.

2. The system of claim 1 wherein said packet switch is an asynchronous transfer mode (ATM) switch.

3. The system of claim 2 wherein each said digital subscriber line access router provides Ethernet bridging capabilities between said web servers and said user terminals.

4. The system of claim 2 wherein said multiplexor comprises multiplexor/demultiplexor linecards and said means for routing said packet through said packet switch comprises a system controller for enabling the router function and further comprising a data/control bus to which said line cards and said system controller are connected.

5. The system of claim 4 wherein said means for establishing connections between said users terminals and said web servers through said packet switch further comprises a telephone splitter connected to said data/control bus and an ATM/Sonet card connected between said data/control bus and said packet switch.

6. A method for providing communication of bit streams between user terminals and web servers through a packet switch to one side of which the user terminals are connected and to the other side of which web servers and default routers for said web servers are connected, but without any backbone routers being connecter thereto, said bit streams being organized into packets including a message portion and an address header portion, method comprising the step of transmitting packets from a user terminal to one side of said packet switch through a digital subscriber line access router which functions both as a multiplexor for said packets and as a router responsive to the address header portion of said packets, whereby the requirement of a user terminal to communicate through the packet switch via backbone edge routers is obviated, thereby reducing network traffic through said packet switch.

7. The method of claim 6, wherein said packet switch is an asynchronous transfer mode (ATM) switch.

* * * * *